United States Patent

[11] 3,547,218

[72] Inventor Ferris F. Hamilton
 320 High St., Denver, Colo. 80218
[21] Appl. No. 759,221
[22] Filed Sept. 11, 1968
[45] Patented Dec. 15, 1970

[54] METHOD OF GENERATING SEISMIC IMPULSES
 7 Claims, 2 Drawing Figs.
[52] U.S. Cl. .................................................. 181/0.5;
 340/15.5
[51] Int. Cl. ........................................... G01v 7/00,
 G01v 1/00, G01v 9/00
[50] Field of Search .......................................... 181/0.5Cr,
 Cs; 340/15.5 Comp.; 340/2

[56] References Cited
 UNITED STATES PATENTS
 2,717,656  9/1955  Bannister ..................... 181/0.5
 3,062,315  11/1962  Herzog ........................ 181/0.5
 3,237,151  2/1966  Thorpe ........................ 340/2

Primary Examiner—Richard A. Farley
Assistant Examiner—Daniel C. Kaufman
Attorney—John E. Reilly ABSTRACT: A helicopter is utilized as a seismic energy source in geophysical prospecting by developing seismic impulses from the rotor blades as the helicopter is flown into and away from close proximity to each intended test location or site.

PATENTED DEC 15 1970
3,547,218
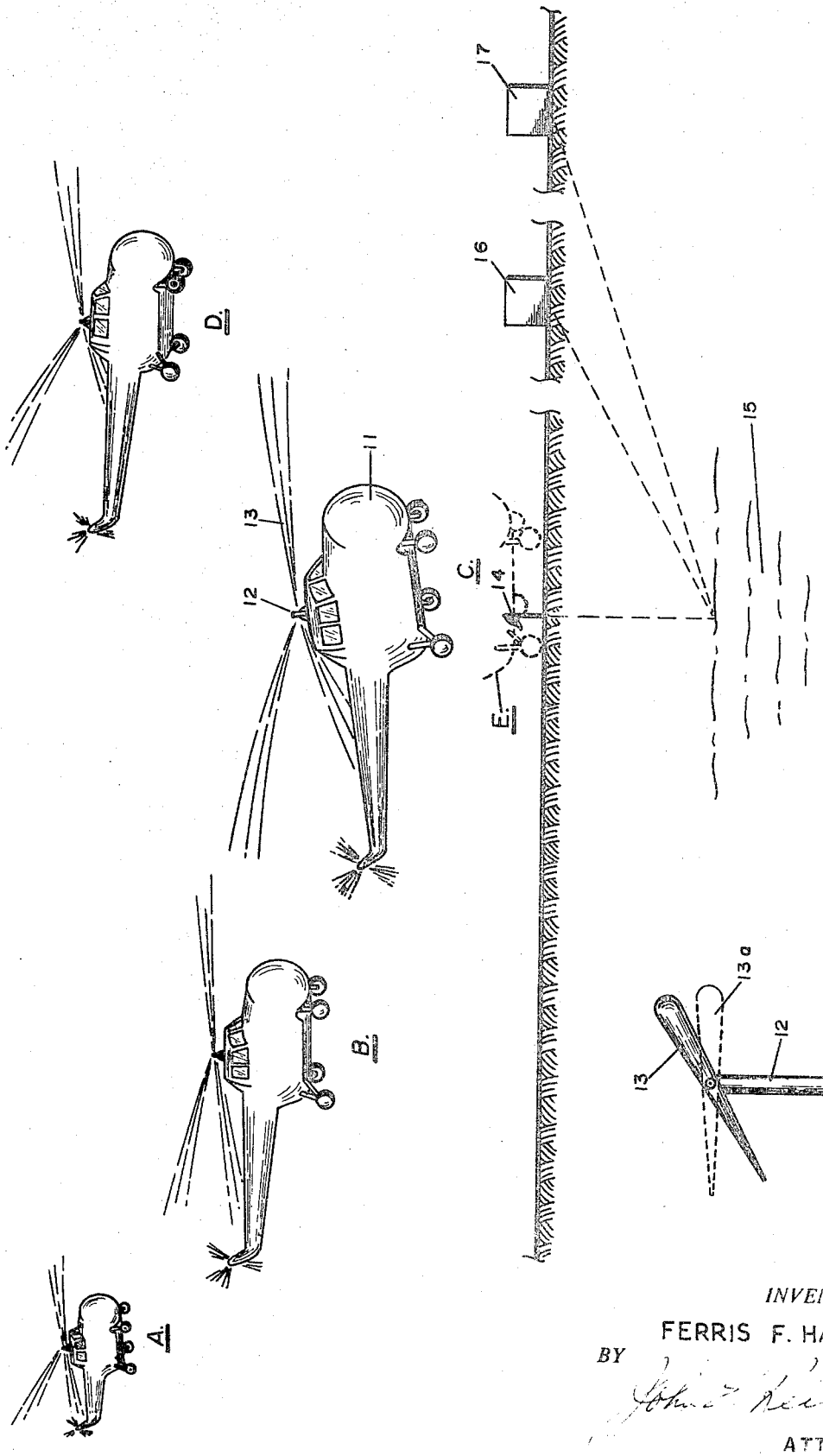
INVENTOR.
FERRIS F. HAMILTON
BY
ATTORNEY

METHOD OF GENERATING SEISMIC IMPULSES

This invention relates to a novel and improved method and means for generating seismic impulses in geophysical prospecting operations, and specifically wherein a helicopter is utilized as a seismic energy source.

In geophysical prospecting, substantial improvements have been made in the sensitivity and quality of detecting instruments and which has made it possible in recent years to utilize surface sources of seismic energy by which seismic impulses can be transmitted into the earth, for example, without the necessity of subsurface placement of the energy device. Thus it is possible to obtain detectable reflections from single impacts of falling weights; also, vibrating sources have been employed and which take the form of continuous wave generators and possess the advantage that the frequency is adjustable to conform to the transmitting or reflected characteristics of the earth as it varies from location to location. For the most part however past methods have necessitated some physical contact with the earth and have not been readily transportable from one location to another especially in heavily forested or swampy areas.

It is therefore an object of the present invention to provide for a novel and improved method and means for generating seismic impulses which is portable and does not require direct contact with the earth's surface.

It is another object of the present invention to utilize an airborne craft capable of generating and imparting seismic impulses to the earth's surface; and further wherein the impulses generated may be closely regulated both in frequency and intensity.

It is a further object of the present invention to utilize the vibrational noise produced by a helicopter to generate seismic impulses in the form of continuous or repetitive wave generations which can be closely regulated in frequency and intensity, as well as in distance or spacing either directly against or above the earth at the selected location.

In accordance with the present invention, an airborne craft, preferably a helicopter, is employed in geophysical prospecting as a seismic energy source which can be flown into each selected site and regulated to generate a succession of vibrational impulses which are sent downwardly into the earth. The seismic waves propagated are detected by one or more sensing devices at spaced locations from the selected site. The airborne craft may or may not be landed at each site and either may hover at the site or fly gradually in and away from the site in generating a succession of seismic impulses. The intensity and frequency of the impulses generated can be closely regulated according to variations in characteristics at the earth's crust or surface.

In geophysical prospecting, whether carried out using the reflection or refraction technique, each desired location is laid out in advance and the detecting instruments are arranged in predetermined spaced relation to each location when the seismic energy is applied at that point. Upon completion of each test, the seismic equipment is advanced to the next location and the test or survey repeated. During each test, the detecting instrument or instruments will convert the seismic oscillations reflected from the earth into electrical signals and the usual procedure is to produce a seismogram therefrom. Where vibrating sources are employed, the frequency of the reflected waves can be modulated according to the transmitting or reflecting characteristics of the earth at each point, but in any event the test can be carried on at each location until optimum frequency wave generation is obtained.

It is desirable in accordance with the present invention to avoid overland transportation of equipment particularly in areas difficult to gain access, such as, heavily forested or swampy areas. In my copending Pat. applications, Ser. No. 738,572 for Method and Apparatus for Airborne Seismic Exploration, filed 20 June, 1968, now U.S. Pat. No. 3,509,960; and Ser. No. 746,912, for Airborne Seismic Exploration Method and Apparatus Having Earth-Penetrating Means, filed 23 July, 1968, now U.S. Pat. No. 3,436,167, airborne crafts are employed as a means for transportation of seismic energy equipment from one location to another. In many instances, particularly shallow surveys, it has been found possible to utilize the vibratory forces or noise energy generated by an airborne craft to develop seismic impulses which can be detected with conventional equipment. This is especially true of the helicopter wherein the vibrational and stability characteristics of the helicopter in flight and in hovering over a particular location are such that it will generate a repetitive beat or thumping which is imparted to the earth. Here the helicopter preferably is designed to produce maximum noise and vibrational energy for transmission downwardly through the earth at each selected location and at the frequency of the rotor blade system of the helicopter. Thus while the repetitive beat or thumping of the helicopter is most desirably damped out in conventional use, the reverse is done in utilizing the helicopter as a seismic source in accordance with the present invention.

It is helpful to examine those characteristics peculiar to a helicopter making it ideally suited for its intended use as a seismic source. Helicopters presently in use are designed with one or more rotor systems in which the rotor blades are either hinged or rigidly connected to a central hub. Each of the rotors may be furnished with one to four or more blades, the choice depending on such factors as vibration, weight and economy in manufacture. Generally, however, the vibrational characteristics of the craft will tend to decrease with an increasing number of blades. In flight the helicopter is controlled by producing movements about the rotor hub, by tilting the resultant rotor lift reactor, or by a combination of both. Conventionally however control is achieved through collective pitch changes and specifically by a linkage from the blades to a swash plate on the rotor, the swash plate controlling the pitch of the blades. Most importantly, the vibration and noise of the helicopter in flight or in operation are influenced more by the design of the individual rotor blades. Typically, blades vary in the degree of twist or taper, but even under optimum design are prone to generate extremely high vibrational forces in hovering, normal flight and on the ground. If the force input form each rotor blade is identical, the vibrations or oscillations will occur at a frequency which is an even multiple of the rotor blades and are applied in vertical, fore and aft or sideward directions. The reduction or damping of these input forces from the rotor system is primarily a matter of blade design and is to some extent depending upon fuselage structure as well. As a result, the intensity of the vibrational forces developed by the helicopter can be controlled by the rigging of the rotor blades on a helicopter designed to produce maximum vibrational forces for seismic input, and further can be controlled by the attitude or collective pitch of the blades as regulated by the pilot in approaching each selected test location. Moreover, the frequency can be selectively varied by regulating rotor speed within limits over a predetermined range to realize optimum transmission of reflected seismic waves.

FIG. 1 shows the operation of the helicopter in carrying out the present invention.

FIG. 2 shows the variation in collective pitch of the helicopter rotor blade.

In carrying out the present invention in practice, the seismic input helicopter 11 having a rotor shaft 12 and rotor blades 13 is flown in toward the test site represented at a flag 14 and, as it approaches the site, is caused to undergo a gradual descent represented as stage A, B and C, respectively with a decrease in collective blade pitch in order to intensify the rotor blade noise and create a heavy thumping which is transmitted to the earth in the vicinity of the test location and this blade thumping also results when the helicopter is flown away from the site with a decrease in collective pitch represented at stage D. The decrease in collective pitch is illustrated in FIG. 2 wherein each blade 13 rotates about its axis to another angular position as represented in dashed lines 13a. As previously noted conventional pitch control is achieved through linkage from the blades to a swash plate on the rotor. The helicopter may hover in close proximity above the test location to continue to generate a repetitive beat or thumping which together with the vertical downwash of air is imparted to the ground to create a succession of seismic impulses which will reflect off substrata represented at 15 under the surface. These impulses are picked up in the form of reflected seismic waves at the geophone stations 16 and 17 located at spaced intervals from the test location, and most desirably communication is established between the helicopters and geophone stations to inform the pilot of the test results so that any necessary variation in frequency and pitch may be made. At the completion of the test the helicopter is flown to the next test site; and similarly the detecting instruments may be advanced by helicopter into position for the next test and the procedure repeated.

In order to further intensify the seismic impulses the helicopter may touch ground as represented in dashed lines at E at the helicopter location so that additional vibrational forces are transmitted through the fuselage structure to the ground, care being taken to avoid development of resonant frequencies and self-exciting vibrations which could be destructive of or damaging to the helicopter.

It is apparent from the foregoing that the helicopter may serve as a highly efficient portable means of generating seismic impulses, especially in otherwise inaccessible areas which cannot be reached with conventional seismic equipment. Moreover the seismic input helicopter may be used in transporting and moving the detecting stations from one location to the other in setting up each test. Again the helicopter should be specifically designed to provide maximum vibrational and noise energy for most effective results. While the helicopter has definite limitations in the amount of energy that can be developed for seismic surveys, since the vibrational forces developed must be maintained within safe limits, it nevertheless possesses the advantage of permitting close regulation of the frequency and intensity of vibrations developed according to variations in characteristics of the earth at each test location.

It is to be understood from the foregoing that modifications and changes may be made in the particular sequence of steps and manner of design of the airborne equipment for conducting each test without departing from the spirit and scope of the invention.

I claim:

1. The method of generating seismic impulses at a selected location for transmission through the earth's surface comprising the steps of:
    flying a helicopter into close proximity to the earth's surface at the selected location;
    regulating the collective pitch of the rotor blades to impart a succession of seismic shock waves to the earth's surface; and
    detecting the seismic shock waves generated at least at one other location spaced from the test location.

2. The method according to claim 1 being further characterized by hovering the helicopter over the test location to produce a succession of seismic impulses of predetermined frequency and intensity from the vibrational and noise energy of the rotor blades.

3. The method of generating seismic impulses at a selected location for transmission through the earth's surface comprising the steps of:
    flying a helicopter into close proximity to the earth's surface at the selected location;
    regulating the rotor blades by decreasing their collective pitch to induce a repetitive beat of the rotor blades and thereby impart a succession of seismic shock waves to the earth's surface; and
    detecting the seismic shock waves generated at least at one other location spaced from the test location.

4. The method of generating seismic impulses at a selected location for transmission through the earth's surface comprising the steps of:
    flying a helicopter into close proximity to the earth's surface at the selected location through a predetermined flight path toward and away from the location and simultaneously decreasing the collective blade pitch to intensity the blade noise and thereby to increase the amplitude of the seismic impulses generated; and
    detecting the seismic shock waves generated at least at one other location spaced from the test location.

5. The method of generating seismic impulses at a selected location for transmission through the earth's surface comprising the steps of:
    flying a helicopter into close proximity to the earth's surface at the selected location;
    regulating the collective pitch of the rotor blades to impart a succession of seismic shock waves to the earth's surface;
    varying the rotor blade speed of the helicopter to modulate the frequency of the shock waves; and
    detecting the seismic shock waves generated at least at one other location spaced from the test location.

6. The method according to claim 5 being further characterized by landing the helicopter at the test location and generating a succession of seismic impulses.

7. The method of generating a seismic impulses in each of a succession of test locations for transmission through the earth's surface for detection at least at one other location spaced from each test location comprising the steps of:
    flying a helicopter into close proximity to the earth's surface at each selected test location and hovering the helicopter in close proximity above each test location over a predetermined time interval;
    decreasing the collective pitch of the rotor blade to impart a succession of seismic shock waves of predetermined frequency and intensity to the earth's surface at each selected test location;
    detecting the seismic shock waves generated and reflected at least at one other location spaced from each test location; and
    flying the seismic input helicopter to each next location in succession.